United States Patent [19]

DeFazio et al.

[11] Patent Number: 5,303,886
[45] Date of Patent: Apr. 19, 1994

[54] METHOD AND APPARATUS FOR SUPPORTING AN OBJECT FROM A CHANNEL

[75] Inventors: Salvatore C. DeFazio, Bergen; Frederick J. Case, Hamlin, both of N.Y.

[73] Assignee: Eastman Kodak Company, Rochester, N.Y.

[21] Appl. No.: 812,317

[22] Filed: Dec. 23, 1991

[51] Int. Cl.⁵ .................................................. F16L 3/00
[52] U.S. Cl. ......................................... 248/62; 248/73; 248/74.1
[58] Field of Search .................... 248/73, 51, 52, 67.7, 248/69, 74.1, 309.2, 297.2, 61, 62, 225.1, 222.3; 211/94, 162; 403/348, 353

[56] References Cited

U.S. PATENT DOCUMENTS

| | | |
|---|---|---|
| Re. 15,581 | 4/1923 | Brenizer . |
| 448,359 | 3/1891 | Nichols . |
| 622,778 | 4/1899 | Nordyke ........................ 248/297.2 |
| 1,020,969 | 3/1912 | Dissel . |
| 1,155,127 | 9/1915 | Brenizer ................................ 248/61 |
| 1,215,009 | 2/1917 | Edwards . |
| 1,221,006 | 3/1917 | Wessel . |
| 1,365,623 | 1/1921 | Newhall et al. ..................... 248/69 |
| 1,369,828 | 3/1921 | Matthews ............................ 248/61 |
| 1,373,165 | 3/1921 | Brenizer ............................... 248/61 |
| 1,381,227 | 6/1921 | Pleister et al. ....................... 248/69 |
| 1,387,489 | 8/1921 | Hiss ...................................... 248/69 |
| 1,682,737 | 9/1928 | Blackburn . |
| 1,789,997 | 1/1931 | Blackburn . |
| 1,873,477 | 8/1932 | Quarles ............................ 248/61 X |
| 1,921,797 | 8/1933 | Armie .................................. 248/69 |
| 2,034,928 | 3/1936 | St. John . |
| 3,161,263 | 12/1964 | Stokes ............................. 248/222.3 |

FOREIGN PATENT DOCUMENTS 348297  5/1931  United Kingdom ................. 248/61

Primary Examiner—David L. Talbott
Attorney, Agent, or Firm—Leonard W. Treash, Jr.

[57] ABSTRACT

A method and apparatus for supporting an object from a channel. The apparatus is comprised of a channel clip, formed of a flexible material, whose length is much greater than its width and which is adapted to be applied to a channel. The channel clip includes a receiving loop and a pair of arms extending from the respective sides of the loop. The arms extend in the same direction and are spaced from each other. A retaining loop extends from each arm. The retaining loops lie in essentially parallel planes, and the outer perimeter of the retaining loops conforms generally in shape to a surface which defines the channel. The channel clip is used to support an object from a channel by first inserting the object into the receiving loop. The receiving loops are then pressed together and aligned such that planes within which the receiving loops lie are parallel with the channel. The retaining loops are inserted into the channel after which the channel clip is rotated about 90° to secure the retaining loops in the channel.

2 Claims, 3 Drawing Sheets

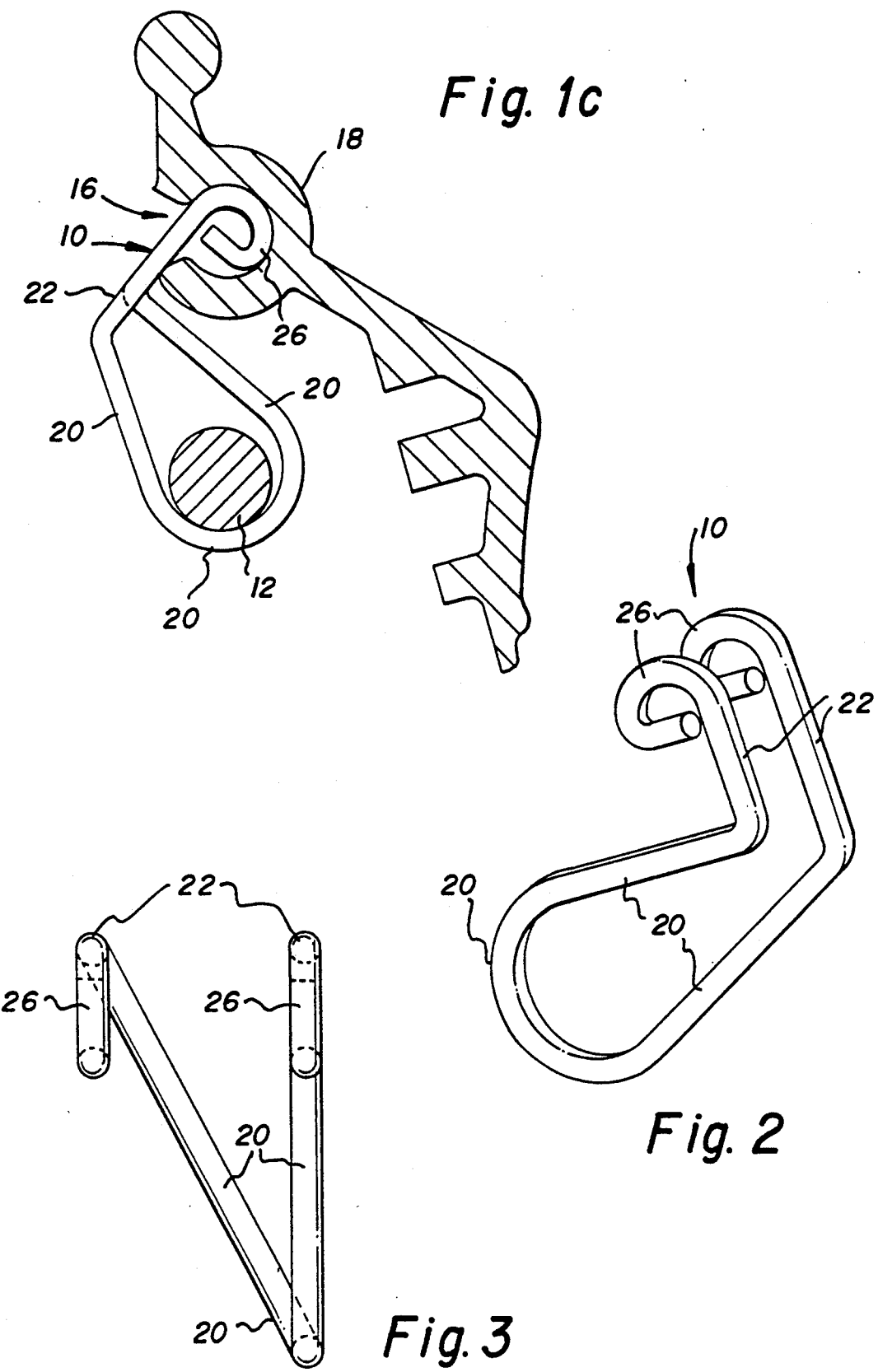

METHOD AND APPARATUS FOR SUPPORTING AN OBJECT FROM A CHANNEL

FIELD OF THE INVENTION

This invention relates generally to support apparatus, and specifically to a channel clip for supporting a cable or the like from a channel.

BACKGROUND OF THE INVENTION

In a particular electrostatographic reproduction machine, it was discovered that certain electrical cables in the vicinity of a toning station needed further support than they already had. A simple solution to this requirement was desired without having to modify the existing toning station.

SUMMARY OF THE INVENTION

The present invention provides a method and apparatus for supporting an object from a channel. The apparatus is comprised of a channel clip, formed of a flexible material, whose length is much greater than its width and which is adapted to be applied to a channel. The channel clip includes a receiving loop and a pair of arms extending from the respective sides of the loop. The arms extend in the same direction and are spaced from each other. A retaining loop extends from each arm. The retaining loops lie in essentially parallel planes, and the outer perimeter of the retaining loops conforms generally in shape to the surface which defines the channel.

The channel clip is used to support an object from a channel by first inserting the object into the receiving loop. The receiving loops are then pressed together and aligned such that planes within which the receiving loops lie are parallel with the channel. The retaining loops are inserted into the channel after which the channel clip is rotated about 90° to secure the retaining loops in the channel.

Although this invention was made to solve a particular problem in a particular image forming apparatus, it is believed to have general application to support cables or other similar structure in other comparable apparatus.

BRIEF DESCRIPTION OF THE DRAWINGS

In the detailed description of the preferred embodiments of the invention presented below, reference is made to the accompanying drawings, in which:

FIG. 1C is a side schematic illustrating a channel clip inserted in a channel defined by the housing.

FIG. 2 is a perspective view of a channel clip.

FIG. 3 is an end view of the channel clip.

DETAILED DESCRIPTION OF THE BEST MODE

Figure 1A:
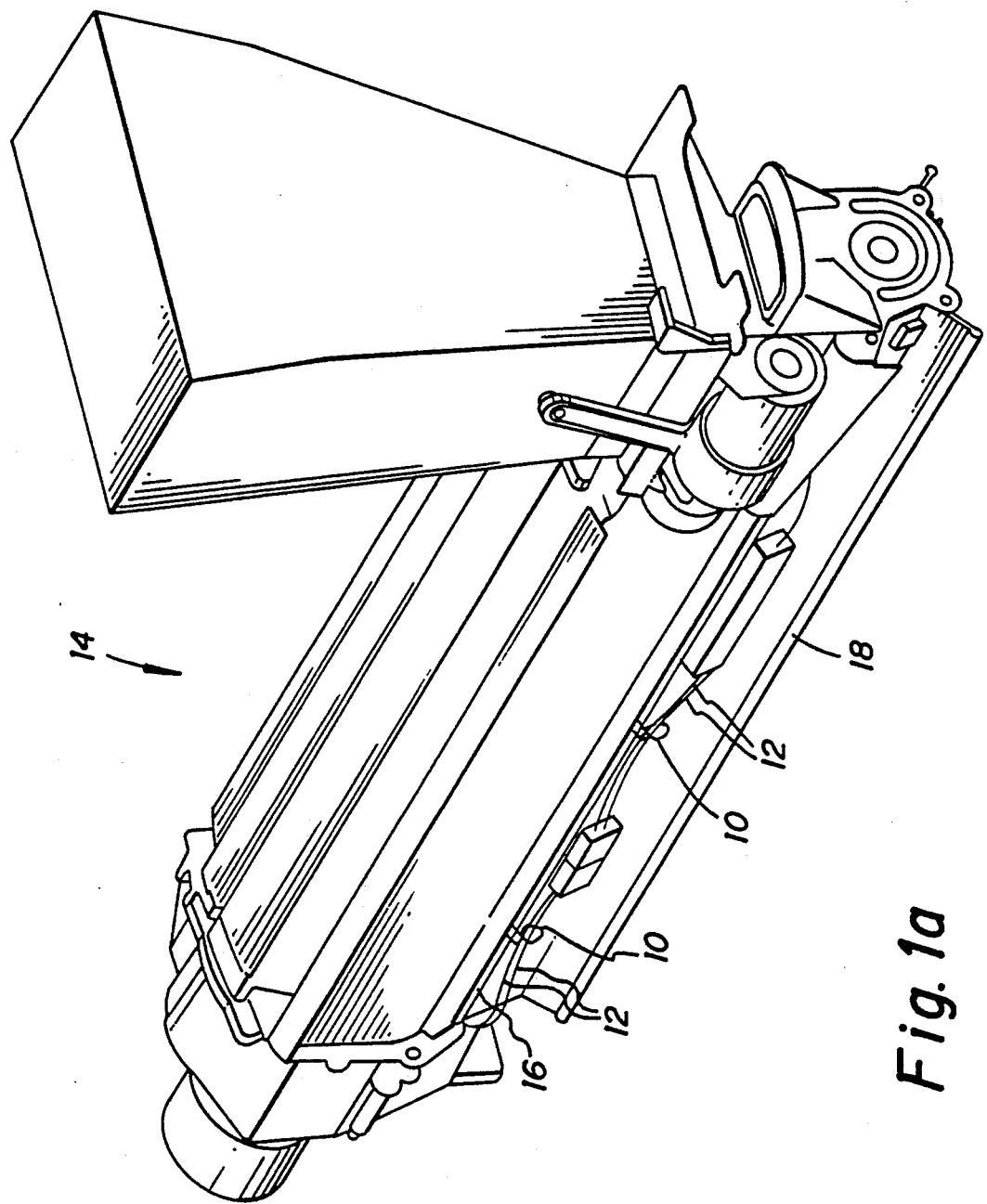
FIG. 1A is a perspective view of a toning station for an electrostatographic apparatus in which the present invention is utilized.

With reference to FIG. 1, a toning station designated generally by the reference numeral 14, includes a housing 18, which defines a channel 16. Channel clips 10, attached to channel 16, support electrical cables 12.

Figure 1B:
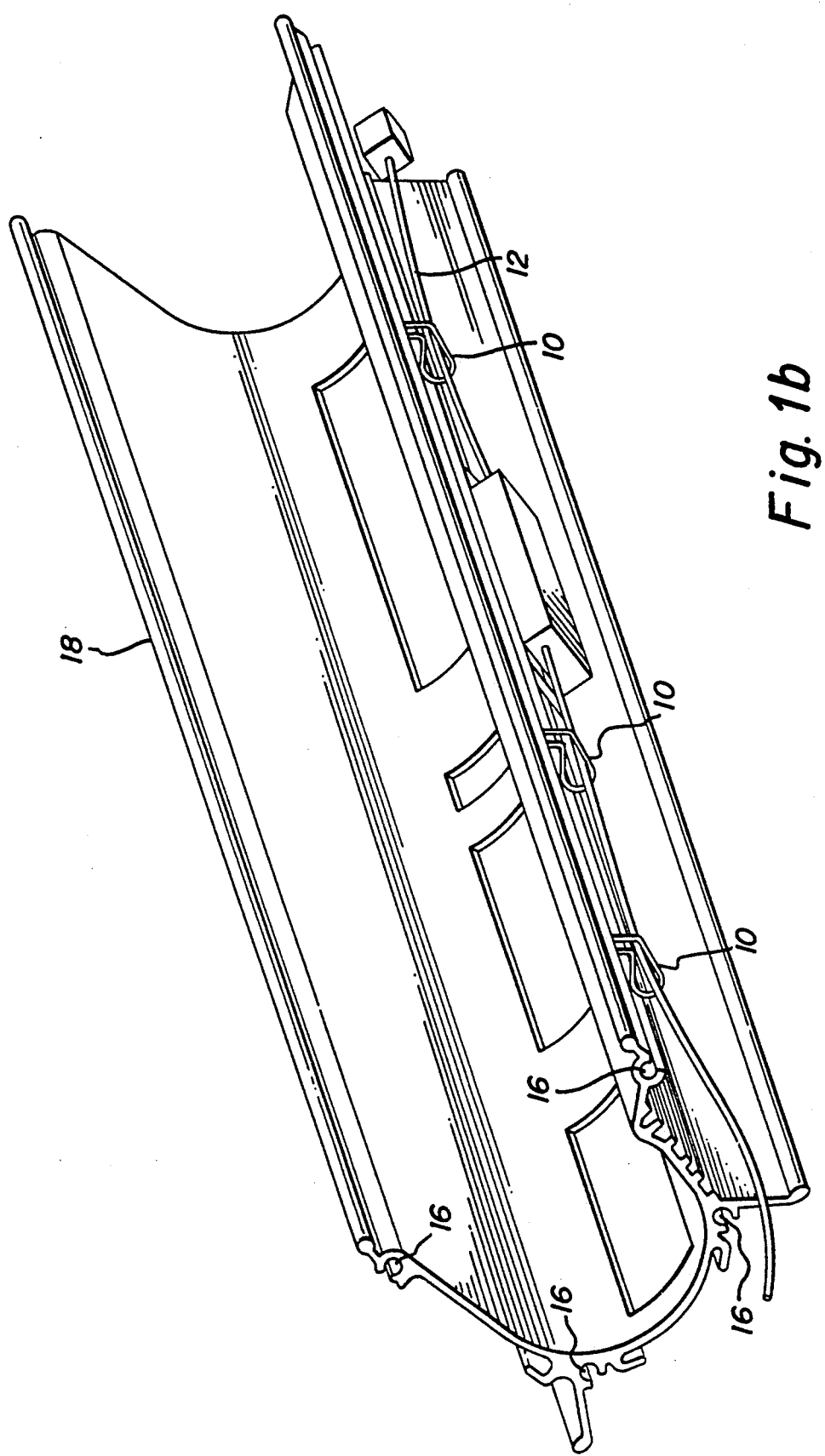
FIG. 1B is a perspective view of a housing of the toning station shown in FIG. 1A with channel clips attached thereto.

FIG. 1B is a perspective view of the housing of the toning station of FIG. 1A. Housing 18 defines four channels 16 which run the entire length of the housing. The ends of the channels are used to receive self-tapping screws which secure end plates (not shown) to the housing. Channel clips 10 are again shown secured into channel 16. The channel clips support electrical cable 12.

The channel clip and its method of use will be described in further detail with reference to FIGS. 1C, 2 and 3. The channel clip is formed of a single piece of flexible material, preferably a wire formed of spring steel. Alternatively, the channel clip may be made of plastic. The channel clip includes a cable receiving loop 20 for supporting the electric cable. As may be seen in FIGS. 2 and 3, the loop is non-planar. A pair of arms 22 extend from the cable receiving loop. The arms extend in the same direction and are spaced apart such that cable 12 can be inserted between the two arms. Extending from each arm is a retaining loop 26. The retaining loops lie in essentially parallel planes. As can be seen in FIG. 1C, the outer perimeter of each retaining loop substantially corresponds in shape to that surface of housing 18 which defines channel 16.

The channel clip 10 is used in the following way. An electric cable 12, which is to be supported, is inserted between retaining loops 26. The cable is guided past arms 22 and inserted into cable receiving loop 20. To insert the channel clip into the channel the retaining loops 26 are pressed together. The channel clip is then oriented proximate channel 16 such that the planes in which the retaining loops lie are essentially parallel with the channel. Retaining loops 26 are then inserted into the channel. The channel clip is next rotated approximately 90 degrees about an axis which is perpendicular to channel 16. Retaining loops 26 will spread back apart due to the flexibility of the material from which the channel clip is made. In this position, channel clip 10 can not be removed from channel 16.

The present invention is not limited to supporting an electrical cable from a channel in a toning station. It may be used to provide support for other objects from an available channel.

We claim:

1. A method of supporting an object from a channel utilizing a channel clip formed of a single elongated wire shaped piece of metal or plastic, said piece having first and second ends and being shaped to define a large cable receiving loop and two arms forming and extending away from said receiving loop in substantially the same direction and terminating at small retaining loops at each of said first and second ends, one arm being bent more than the other to position the receiving loop substantially to one side of the portions of the arms extending between the receiving loop and the retaining loops, said method comprising the steps of:
    a) inserting the object to be supported into the receiving loop;
    b) pressing the retaining loops together;
    c) aligning the planes within which the retaining loops lie such that the planes are parallel with the channel;
    d) inserting the retaining loops into the channel; and
    e) rotating the channel clip about 90° to secure the retaining loops within the channel.

2. A channel clip for holding an electrical cable and for insertion in a channel, which channel has a side exit generally defined by upper and lower abutments, the channel clip comprising an elongated wire shaped material, shaped to form a receiving loop for the cable, a pair of arms forming the loop and extending from the loop and having ends shaped to fit the channel, the arms having portions intermediate the receiving loop and the shaped ends for engaging the upper and lower abutments, one of said arms being substantially bent to position the receiving loop generally below the exit to the channel when the shaped ends are received in the channel.

* * * * *